United States Patent
Hansen

(10) Patent No.: US 10,514,664 B2
(45) Date of Patent: Dec. 24, 2019

(54) DEVICE FOR CONTROLLING HEIGHT-ADJUSTABLE TABLES

(71) Applicant: Kesseböhmer Produktions GmbH & Co. KG, Weilheim/Teck (DE)

(72) Inventor: Melf Hansen, Gondelsheim (DE)

(73) Assignee: KESSEBÖHMER PRODUKTIONS GMBH & CO. KG, Weilheim/Teck (DE)

( * ) Notice: Subject to any disclaimer, the term of this patent is extended or adjusted under 35 U.S.C. 154(b) by 207 days.

(21) Appl. No.: 15/568,200

(22) PCT Filed: Apr. 13, 2016

(86) PCT No.: PCT/EP2016/058106
§ 371 (c)(1),
(2) Date: Oct. 20, 2017

(87) PCT Pub. No.: WO2016/169824
PCT Pub. Date: Oct. 27, 2016

(65) Prior Publication Data
US 2018/0120790 A1    May 3, 2018

(30) Foreign Application Priority Data
Apr. 21, 2015  (DE) .................. 10 2015 207 257

(51) Int. Cl.
*A47B 9/00*        (2006.01)
*G05B 13/02*       (2006.01)
*G05B 19/042*      (2006.01)
*A47B 87/00*       (2006.01)

(52) U.S. Cl.
CPC ............ *G05B 13/0265* (2013.01); *A47B 9/00* (2013.01); *A47B 87/002* (2013.01); *G05B 19/0423* (2013.01); *A47B 2200/0056* (2013.01); *A47B 2200/0081* (2013.01)

(58) Field of Classification Search
CPC .......................... A47B 2200/0056; A47B 9/00
See application file for complete search history.

(56) References Cited

U.S. PATENT DOCUMENTS 5,259,326 A * 11/1993 Borgman .............. A47B 9/00
                                                         108/147
6,360,675 B1 * 3/2002 Jones ................... A47B 9/00
                                                         108/50.02
7,091,692 B2    8/2006 Ctvrtnicek et al.

FOREIGN PATENT DOCUMENTS

DE      200 02 886 U1    4/2000
DE      10 2004 050 212 A1    4/2006
DE      10 2004 050212 A1    4/2006
(Continued)

OTHER PUBLICATIONS

International Search Report and Written Opinion for Application No. PCT/EP2016/058106, dated Jun. 14, 2016 (12 pages).

*Primary Examiner* — Muhammad S Islam
(74) *Attorney, Agent, or Firm* — Womble Bond Dickinson (US) LLP; John J. Penny, Jr.

(57) ABSTRACT

A device for controlling height-adjustable tables, wherein a plurality of tables is connected to said device. The use of this device allows all tables that are connected to the device to be controlled using only one control unit that is also connected to said device. Accordingly, equipping each table with a separate control unit is rendered superfluous by this device. This makes the entire design simpler and more cost-effective.

20 Claims, 2 Drawing Sheets

(56) References Cited

FOREIGN PATENT DOCUMENTS

Figure 1:
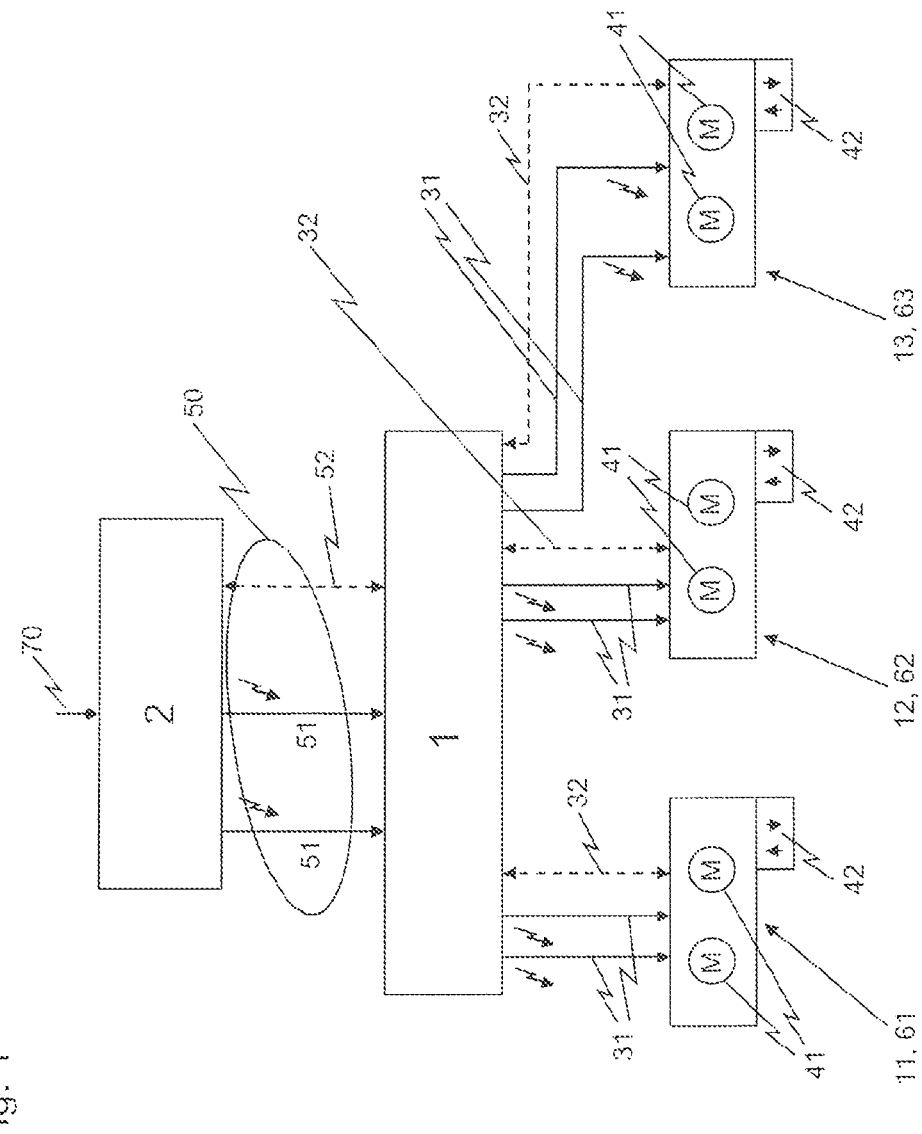

| | | | |
|---|---|---|---|
| DE | 10 2007 054 422 | A1 | 5/2009 |
| EP | 1837723 | A3 | 5/2008 |
| WO | 2013/170955 | A1 | 11/2013 |
| WO | 2014/108342 | A1 | 7/2014 |

* cited by examiner

DEVICE FOR CONTROLLING HEIGHT-ADJUSTABLE TABLES

The present application claims priority under 35 U.S.C. § 119 to German Application No. 10 2015 207 257.6, filed on Apr. 21, 2015 and under 35 U.S.C. § 365 to PCT/EP2016/058106, filed on Apr. 13, 2016, the disclosures of which are expressly incorporated herein by reference.

The invention relates to a device which is provided for controlling height-adjustable tables.

Height-adjustable furniture pieces such as tables have several components. These include a current supply, a controller, an input device, and at least one electric motor which is installed in at least one table column.

When a plurality of height-adjustable tables are operated as a unit, it is known in the art to supply current to all height-adjustable tables and their controllers by means of only one current supply. Each of these tables includes a controller which controls the motors installed in the table. Furthermore, it is known to provide a separate controller for each electric motor. Accordingly, a composite of a plurality of height-adjustable tables includes a plurality of controllers in the prior art. Among the individual components of a height-adjustable table, the controller is one of the expensive components, and thus the share of expenses for controllers is relatively high in a composite of several height-adjustable tables.

It is an object of the present invention to provide a device for controlling height-adjustable tables, which allows providing a composite of several height-adjustable tables more cost-effectively. The object is achieved by means of a device having the features of claim 1, as well as by a system according to claim 5 and by a method according to claim 10. The term "height-adjustable table" is not intended to be limiting, but intended to encompass all conceivable types and forms of adjustable furniture.

Advantageous further developments are the subject of the dependent claims.

By means of the device, it is possible to control a plurality of height-adjustable tables using only one controller. Herein, the device functions as a distributor (HUB) or moderator or relay between the individual tables and the controller. Upon actuation of an operating element at one of the tables, the user input is detected by the device. Then, the device communicates to the controller, which user input is detected from which input element or from which table. From the information from which input element the user input originates is used by the controller to determine which and how many motors are to be controlled, as well as their control parameters. These control parameters include, for example, the type of motor(s) installed in the table to be controlled, so that the controller may subsequently determine the required driving current. The control parameters further include the current position of the height-adjustable table with regard to its travel path. The command output by the controller or the driving current intended for the motors is passed, by means of the device, to the table to be controlled or its motor(s). During this time, the device locks the remaining connected to the device tables, because the controller can only control the respective tables one at a time. That is, user input at all tables is ignored, except for the table currently in use. Accordingly, it is not possible control or to move a plurality of tables simultaneously by means of the device. Once the user input, and thus the adjustment of a height-adjustable table, is completed, the device waits for new user input. Said new user input may originate from any table and is accepted by the device. Due to this configuration, it is possible to control a plurality of height-adjustable tables or height-adjustable furniture pieces, wherein only a single controller is required. Thereby, an assembly of a plurality of height-adjustable tables may be built and operated particularly cost-effectively.

When a user input has been detected at an operating element by means of the device, the device preferably informs the controller from which operating element the passed on control command originates. In this way, the controller can recognize which of the height-adjustable tables is to be moved. Before outputting a driving current, it is particularly relevant to the controller in which position or in which extension height the table to be controlled is currently located. In addition, the controller requires the motor parameters of the motor(s) to be controlled for determining the driving current. Preferably the controller comprises a processor for data processing. Preferably, the controller comprises a memory in which the parameters and the current position of the motors connected to the device are stored.

When the controller outputs a control signal or a driving current according to a received user input, the device passes this control signal or the driving current preferably to the motor(s) to be controlled so that only the appropriate motor(s) are moved. Therefore, the device has to make the decision to which table (or which motor(s)) a signal or a driving current is passed.

The device preferably comprises individual units which comprise the motors and the operating elements. Herein, each unit comprises at least one motor and one operating element. Preferably, each unit is assigned to exactly one table. When a command input from one of these units is passed to the controller by means of the device, the control command (or drive current) output from the controller is returned or put through to the same unit. By dividing the motors and one controller each in different units, the control of the height-adjustable tables can be simplified. For example, when a table includes a plurality of motors, such as three or four motors, all of these motors are moved as a result of a control command (or drive current) once a user input from the same unit is passed to the controller by means of the device.

Preferably, each of the units includes at least one sensor by means of which, for example, a collision of a height-adjustable table with an object is detected, whereby an adjustment of this table is stopped. Preferably, such a sensor signal is passed to the controller by means of the device, so that the signal can be taken into account for controlling. As sensors, for example, FSR sensors or Hall signal generators may be provided.

Preferably, the device includes a communication BUS system. Preferably, the communication between device and controller is performed via such a communication BUS system.

Preferably, the controller comprises an external current supply, via which all of the motors to be controlled by the controller are supplied with current. Preferably, all further components connected (also indirectly via the device) to the controller which require electrical current are also supplied by the external current supply of the controller. As a result, only a single current supply is required for all of the components connected to the controller. Preferably, the controller and the device each have a housing, wherein the two housings may be joined with each other. This particularly simplifies the handling of the controller and the device, since both may be housed as a unit, for example, in a cable duct. As a result, in particular, the assembly of a height-adjustable table or of a plurality of height-adjustable tables is simplified, so that costs can be lowered.

Preferably, the connection between the device and the controller is established through a central cable.

Preferably, the communication between the sensors installed in the table columns and the device as well as with the controller is performed via a communication BUS system. Preferably, the communication between all components, which communicate with the controller and/or the device, is performed via a communication BUS system.

Preferably, the device is configured to pass a received user input including the information of its origin to the controller and to then establish a connection between the controller and the motors to be driven. Preferably, this connection is maintained at least during a control operation, and an additional fixed waiting period. Due to this waiting period, the reaction time is reduced in case of several successive user input operations on the same input device in short time intervals.

In a further preferred embodiment, in case of several simultaneous user input operations, the device decides according to a specified order of priority, which table or which motors are to be coupled to the controller. This allows adjusting a particular "important" table at any time while locking "less important" tables.

In a further preferred embodiment, the system includes a "learning mode". Once it is activated, all the tables connected to the device are successively moved into their extreme positions. Thereby the controller "learns" the maximum possible travel path of each table and the current position of each table with respect to the travel path. Preferably, motor parameters as well as parameters of anti-squeeze sensors or the like can be exchanged between the motors and the controller during the learning.

With reference to the accompanying drawings, a preferred embodiment of the invention will be explained.

The figures show:

FIG. 1: A schematic diagram of an embodiment of the invention with three tables.

Figure 2:
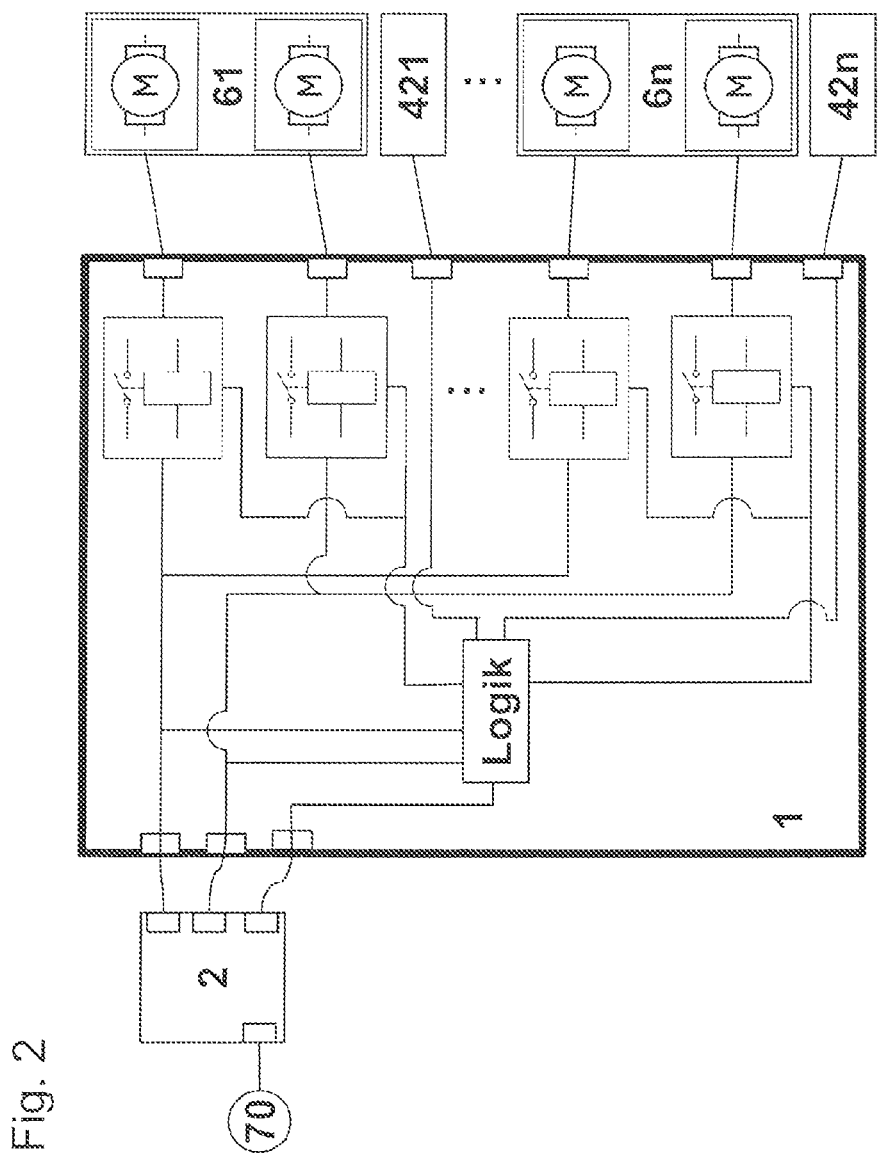

FIG. 2: A schematic of an embodiment with n tables and one operating element per table, as well as a detailed illustration of the schematic diagram of the device (n is an integer variable, wherein this definition applies throughout the specification).

FIG. 1 shows a schematic diagram of an embodiment of the device 1 for controlling height-adjustable tables 61, 62, 63. In the upper region of the illustration, the controller 2 which is provided with an external current supply 70 is shown. Between the device 1 and the controller 2, an interface 50 is provided, said interface 50 comprising three interfaces 51, 51, 52 in the illustrated embodiment, wherein the interfaces 51, 51 are indicated with a schematic lightning, which represents the output of current for supplying the motors 41 installed in motor columns. Through the interface 52, user input made at one of the operating elements 42 is passed to the controller 2 by means of the device 1. Through the interface 52, further sensor signals of sensors which are provided in one of the tables 61, 62, 63 or one of the units 11, 12, 13, respectively, are passed to the controller 2. In the illustrated embodiment three height-adjustable tables 61, 62, 63 are connected to the device 1. The table 61 includes a unit 11, the table 62 includes a unit 12, and the table 63 includes a unit 13. Each of these units 11, 12, 13 further includes two motors 41 and an operating element 42. Furthermore, as is shown in FIG. 1, two interfaces 31 and an interface 32 are provided between each of the units 11, 12, 13 and the device 1. The interface 32 transmits input commands from the operating element 42 and sensor signals to the device 1, which are then passed to the controller 2 by the device 1. The control signal (or the driving current) subsequently output by the controller 2 is passed to the respective unit 11, 12, 13 the device 1 using the interfaces 31.

In one embodiment which is not shown at least one of the tables 61, 62, 63 comprises a plurality of units 11, 12, 13. In this embodiment, at least one of the tables 61, 62, 63 comprises several independently adjustable elements, such as two table plates which are adjustable independently. Here, a separate unit 11, 12, 13 is provided for each of the height-adjustable table plates.

In a further embodiment which is not shown any number of adjustable furniture pieces, each having an arbitrary number of units 11, 12, 13, are provided for each adjustable element.

FIG. 2 shows an embodiment of the device 1 which is connected to a controller 2, wherein the controller 2 is provided with an external current supply 70. Furthermore, the device 1 is connected to a variable number of n tables 61, 6n (rule of generation: n+1) and a variable number of n operating elements 421, 42n (rule of generation: n+1), wherein the operating element 421 is provided to operate the table 61, and the operating element 42n is provided to operate the table 6n, respectively. Furthermore, the device comprises 2n relays for passing on the driving current and logic for controlling the internal processes within the device 1. Each of the tables 61, 6n includes two motor columns M. Furthermore, the device 1 comprises a logic circuit (logic) for controlling the internal processes within the device 1.

In a further embodiment (not shown), the device 1 does not comprise relays, but semiconductor packages.

In a further embodiment (not shown), the device 1 comprises relays and semiconductor packages.

In a further embodiment (not shown) a modification of the embodiment shown in FIG. 2 is provided, where n=2. Therefore, are two tables 61, 62 are connected to the device 1 in this case. Furthermore, four relays are provided within the device 1. However, in this embodiment, the connections within the device 1 differ from the embodiment illustrated in FIG. 2. With only two tables to be controlled, the device does not require the logic anymore, so that the relays of the device are driven directly by the operating elements 421, 422 in this case. In the present embodiment, the device 1 therefore comprises no logic, wherein the two upper relays are driven directly by the operating element 421, and the two lower relays are driven directly by the operating element 422. The terms "upper" and "lower" relate to the representation shown in FIG. 2. In this embodiment, when a user input at the operating element 421 occurs, the upper relays of the device 1 are switched to "conducting", whereas the lower relays have an infinite electric resistance in their rest state, so that the driving current output by the controller 2 is passed to the table 61. In analogy to the reaction just described, a user input at the operating element 422 causes the lower relays to be switched to "conducting", while the upper relays are blocked, so that the table 62 is supplied with driving current by the controller 2.

In a further embodiment (not shown), the device 1 is further configured to pass additional information from the motor circuit boards of the installed motors M to the controller 2. In this embodiment, each motor circuit board includes a memory chip for storing the information. The information to be passed on consists of the identifier of the motor type or the extension height of the motor columns, among other things.

The invention claimed is:

1. A device for controlling two or more motorized height-adjustable tables comprising:
   two or more interfaces, each for supplying a respective motor with current,
   two or more interfaces, each for communicating with a respective operating element,
   an interface for connecting a controller,
   wherein said device is configured to detect an input command from an operating element and to pass it to said controller,
   wherein said device is configured to identify from which operating element said input command originates, to pass the identified operating element to said controller, and to pass current subsequently output by said controller to the motor associated with the operating element from which said input command originates.

2. The device according to claim 1,
   wherein said motors and said operating elements are grouped into individual units,
   wherein each of said units consists of at least one operating element and at least one of said motors,
   wherein said device is configured to pass the input command originating from a unit to said controller and to pass the current subsequently output by said controller to the at least one motor of the same unit.

3. The device according to claim 1, further comprising an interface for communicating with said controller via a communication BUS system.

4. The device according to claim 2,
   wherein each of said units is provided for adjusting the height of a respective table or for adjusting an adjustable part of the respective table,
   wherein each of said units includes at least one sensor,
   wherein said device is configured to pass sensor signals and/or or other information from said motors to said controller.

5. A device for controlling one motorized height-adjustable table comprising:
   two or more interfaces, each for supplying a respective motor with current,
   two or more interfaces, each for communicating with a respective operating element,
   an interface for connecting a controller,
   wherein said device is configured to detect an input command from an operating element and to pass it to said controller,
   wherein said device is configured to identify from which operating element said input command originates, to pass the identified operating element to said controller, and to pass current subsequently output by said controller to the motor associated with the operating element from which said input command originates.

6. The device according to claim 5,
   wherein said motors and said operating elements are grouped into individual units,
   wherein each of said units consists of at least one operating element and at least one of said motors,
   wherein said device is configured to pass the input command originating from a unit to said controller and to pass the current subsequently output by said controller to the at least one motor of the same unit.

7. The device according to claim 5, further comprising an interface for communicating with said controller via a communication BUS system.

8. The device according to claim 6,
   wherein each of said units is provided for adjusting an adjustable part of the respective table,
   wherein each of said units includes at least one sensor,
   wherein said device is configured to pass sensor signals and/or or other information from said motors to said controller.

9. A system including a device for controlling one motorized height-adjustable table, said device comprising:
   two or more interfaces, each for supplying a respective motor with current,
   two or more interfaces, each for communicating with a respective operating element,
   an interface for connecting a controller,
   wherein said device is configured to detect an input command from an operating element and to pass it to said controller,
   wherein said device is configured to identify from which operating element said input command originates, to pass the identified operating element to said controller, and to pass current subsequently output by said controller to the motors associated with the operating element from which said input command originates,
   wherein said controller is configured to supply all of the motors with current by means of an external current supply, and wherein said motors and said operating elements are grouped into individual units.

10. The system according to claim 9, wherein said controller is configured to store and retrieve parameters of each motor and the current position of each motor and height-adjustable element, respectively, with respect to the travel path of the motor.

11. The system according to claim 9, wherein the controller is configured to selectively adjust the height of the units.

12. The system according to claim 9, wherein said controller and said device each comprise a housing, wherein the housings are configured to be connectable with each other.

13. A method for adjusting the height of the motorized height-adjustable table or the plurality of units of the table of a system according to claim 9, comprising the steps of:
   detecting an input command at an operating element,
   identifying the unit a motor of which is to be driven and passing this information to said controller,
   retrieving motor parameters or anti-squeeze-parameters of the motors installed in said unit which is/are to be adjusted, by means of said controller,
   determining the current required by the motors, by means of said controller, and supplying current to said device, and
   passing the current to the unit the motor of which is to be driven for adjusting the table.

14. The system according to claim 12, wherein the housings are mechanically connected.

15. A system including a device for controlling two or more motorized height-adjustable tables, said device comprising:
   two or more interfaces, each for supplying a respective motor with current,
   two or more interfaces, each for communicating with a respective operating element,
   an interface for connecting a controller,
   wherein said device is configured to detect an input command from an operating element and to pass it to said controller,
   wherein said device is configured to identify from which operating element said input command originates, to pass the identified operating element to said controller, and to pass current subsequently output by said controller to the motors associated with the operating element from which said input command originates, wherein said controller is configured to supply all of the motors with current by means of an external current supply.

16. The system according to claim 15, wherein said controller is configured to store and retrieve parameters of each motor and the current position of each motor and height-adjustable element, respectively, with respect to the travel path of the motor.

17. The system according to claim 15, wherein the controller is configured to selectively adjust the height of the height-adjustable tables.

18. The system according to claim 15, wherein said controller and said device each comprise a housing, wherein the housings are configured to be connectable with each other.

19. A method for adjusting the height of the two or more motorized height-adjustable tables of a system according to claim 15, comprising the steps of:
   detecting an input command at an operating element,
   identifying the unit a motor of which is to be driven and passing this information to said controller,
   retrieving motor parameters or anti-squeeze-parameters of the motors installed in said unit which is/are to be adjusted, by means of said controller,
   determining the current required by the motors, by means of said controller, and supplying current to said device, and
   passing the current to the unit the motor of which is to be driven for adjusting the tables.

20. The system according to claim 18, wherein the housings are mechanically connected.

* * * * *